Aug. 18, 1925.

E. W. HAMMER

NEWSPAPER CONVEYER

Filed Oct. 4, 1924

1,550,314

INVENTOR
Edwin W. Hammer

Patented Aug. 18, 1925.

1,550,314

UNITED STATES PATENT OFFICE.

EDWIN W. HAMMER, OF EAST ORANGE, NEW JERSEY, ASSIGNOR TO CLINE ELECTRIC MANUFACTURING COMPANY, OF CHICAGO, ILLINOIS, A CORPORATION OF ILLINOIS.

NEWSPAPER CONVEYER.

Application filed October 4, 1924. Serial No. 741,535.

*To all whom it may concern:*

Be it known that I, EDWIN W. HAMMER, a citizen of the United States, residing at East Orange, in the county of Essex and State of New Jersey, have invented a new and useful Improvement in Newspaper Conveyers, of which the following is a specification.

My invention relates to improvements in newspaper conveyers, and more particularly to a conveyer which is adapted for use in connection with high-speed printing presses.

The object of my invention is to provide a conveyer for newspaper and similar sheets, which will take the newspapers as they are delivered from the press and carry them by some convenient route to the delivery table, whence they are usually distributed by wagon, messenger or mail.

My conveyer is especially designed for the carrying of folded newspapers without smudging the fresh ink where the belts contact with the papers, particularly where the line of travel changes direction. My conveyer also obviates the difficulty in existing conveyers in which the breakage of a single strand or belt may cause serious damage and delay through the loose ends of the belts or strands flying into the folders of the press and becoming involved therewith, or through the striking and injuring of persons near the conveyer.

Figure 1:
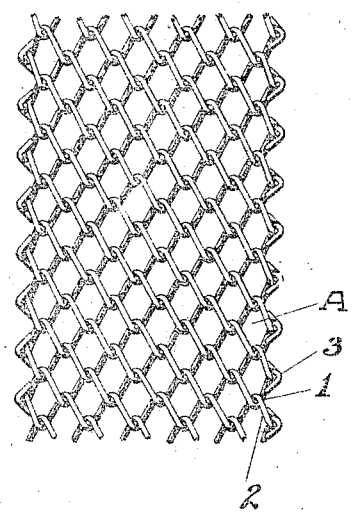
Figure 2:
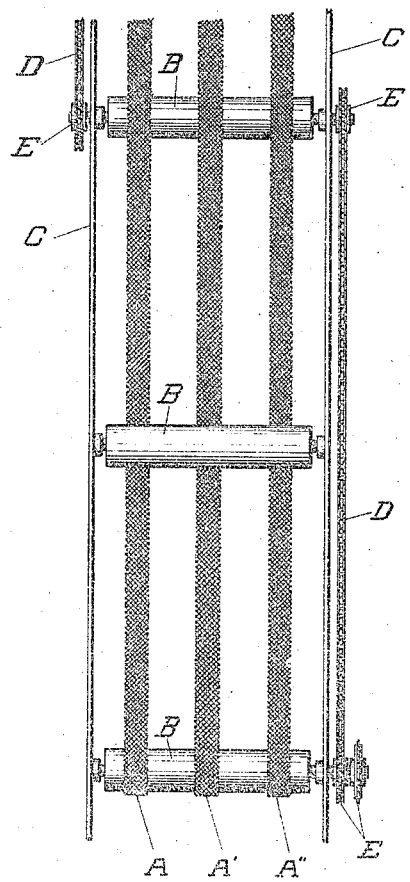
Figure 3:
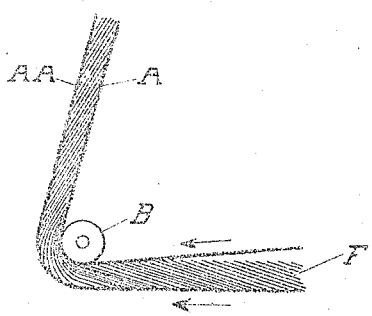

In the accompanying drawings forming part of this specification, Fig. 1 is a view of a section of my preferred form of belt. Fig. 2 is a view of a portion of a conveyer equipped with three of my belts and Fig. 3 is a diagrammatic showing of newspapers being engaged between sets of parallel belts and carried around a sheave or roller.

In general it may be said that my invention is an improvement over the specific forms of conveyers shown in Patents #667,604, Feb. 5, 1901; #862,148, Aug. 6, 1907; #915,632, March 16, 1909 and #1,138,609, May 4, 1915. These conveyers are of the type in which sets of parallel belts are arranged with their adjacent sides traveling in the same direction and adapted to receive folded newspapers between such adjacent sides and by thus gripping the papers hold them firmly as they are transported by the belts. In my conveyers the parallel gripping belts are preferably given a zig-zag course so as to keep the gripping belt-surfaces in close contiguity and in this manner maintain a working grip upon the papers. Suitable means may be employed for subjecting the belts to the requisite degree of tension, such, for example, as adjustable and automatically operative tension pulleys in the manner well known in this art; or the belt may be divided into sections with tension springs interposed; or the mesh of the woven belt may be such as to provide the necessary elastic tension. The sheaves should be directly power-driven so that the carrying belts shall not be required for driving-tension; in other words, the sheaves shall drive the belts and the belts not be required to drive the sheaves.

The belt of leather heretofore used has been about two inches in width and has necessarily contacted with a broad band of the newspapers which it assists in carrying. Although the two parallel belts between which the newspapers are carried are made to run as nearly as possible at the same speed, the fact that the turning radius of the inside belt in passing around a sheave or roller is less than the turning radius of the outside belt, causes the outer belt to lag behind the inner belt at the turning point; this causes a wiping action on the surface of the newspapers which frequently results in a smearing or smudging of the fresh printer's ink. The smearing difficulty is made less where spirally-wound metal belts are employed, as suggested in the above Patent, #1,138,609, but such belts are necessarily of small diameter and their strength is limited, and at least 100% more of them must be used than is necessary with the leather type of belt.

I have discovered that if a woven-wire belt of the general type illustrated in Fig. 1 of the drawings be employed, the number of belts can be minimized and the dangers of smudging or smearing will disappear; I also find that the breakage of a single strand of such a belt does not put that belt out of commission and does not result in throwing the belt into the moving mechanism of the printing press or in injuring an onlooker.

As will be seen from Fig. 1, the belt which I prefer to use is made up of a series of more or less spirally-wound wires of appropriate size running transversely of the belt and interlinked with the adjacent and similar cross-pieces. It will be noticed that pairs of cross-wires are looped together at their ends, thus forming a belt of great strength and having few points of contact with the papers and having the advantage of great flexibility, in that each pair of inter-linked cross-pieces forms a loose hinge, permitting the belt as a whole to pass with great ease around sheaves of small diameter, as indicated in Fig. 2, in which three belts A, A' and A" are run over sheaves or rollers B supported on appriate frame-work C, driven by sprocket chains D working over sprockets E.

If the belts A and AA of Fig. 3 be considered as passing around a sheave or roller B and carrying newspapers F between them, it will be seen that the distance from the center of B to the belt A is less than the corresponding distance to the belt AA. It follows that although the two parallel belts A and AA may have the same linear travel per minute, the inner belt would make a complete revolution about B in less time than the outer belt AA, as it would have a shorter distance to travel in doing so. The consequence is that the outer belt AA lags behind the inner belt A in going around the sheave B. In the case of a flat belt of leather or other material, this is apt to cause a smudging or smearing of fresh ink, while this difficulty is not present in my preferred form of belt in which the points of contact are few and widely separated.

The size of wire and the mesh employed is a matter of engineering choice, depending largely on the length of belt to be employed, the weight of the papers to be conveyed and the diameter of the sheaves employed. The specific belt illustrated in Fig. 1 is 2" in width, is shown as of substantially 18 gauge wire and has about three meshes to the inch. Fig. 1 shows how a cross-wire 1 interlinks with an adjacent cross-wire 2 and how the two adjacent cross-wires are hooked together by loops at their ends as illustrated at 3. It is to be understood that with this construction the two ends of a belt can be brought together and spliced through the simple expedient of inserting a single cross-wire which will interlink with the adjacent cross-wires on either side and then be looped at the ends as shown at the point 3.

While I have shown in this specification a preferred form of woven-wire belt I do not wish to be limited strictly thereto, my invention being sufficiently broad to cover combinations including equivalent forms of belt falling within the terms of the appended claims.

I claim as my invention the following:

1. In a conveyer of the class set forth, a pair of substantially parallel belts of woven wire, having adjacent sides held under tension close together, and means for driving said belts with their adjacent sides traveling in the same direction and at substantially the same speed.

2. In a conveyer of the class set forth, a pair of substantially parallel belts woven from a plurality of transversely extending wires, adjacent sides of said belts held under tension close together, and means for driving said belts with their adjacent sides traveling in the same direction and at substantially the same speed.

3. In a conveyer of the class set forth, a pair of substantially parallel belts woven from a plurality of substantially spiral-shaped transverse wires each of which is intertwined with the two contiguous similar wires and hooked thereto at their ends, adjacent sides of said belts held under tension close together, and means for driving said belts with their adjacent sides traveling in the same direction and at substantially the same speed.

4. In a conveyer of the class set forth, a plurality of pairs of substantially parallel belts of woven wire, each of said pairs having adjacent sides held under tension close together, and means for driving said belts with their adjacent sides traveling in substantially the same direction and at substantially the same speed.

5. In a conveyer of the class set forth, a plurality of pairs of substantially parallel belts woven from a plurality of transversely extending wires, each of said pairs having adjacent sides held under tension close together, and means for driving said belts with their adjacent sides traveling in substantially the same direction and at substantially the same speed.

6. In a conveyer of the class set forth, a plurality of pairs of substantially parallel belts woven from a plurality of substantially spiral-shaped transverse wires each of which is intertwined with the two contiguous similar wires and hooked thereto at its ends, each of said pairs having adjacent sides held under tension close together, and means for driving said belts with their adjacent sides traveling in the same direction and at substantially the same speed.

7. In a conveyer of the class set forth, a woven wire belt, sheaves over which said belt travels, and means for directly driving such sheaves, whereby driving tension is relieved from said belt.

8. In a conveyer of the class set forth, a belt woven from a plurality of transversely extending wires, sheaves over which said belt travels, and means for directly driving such sheaves, whereby driving tension is relieved from said belt.

9. In a conveyer of the class set forth, a belt woven from a plurality of substantially spiral-shaped transverse wires each of which is intertwined with the two contiguous similar wires and hooked thereto at its ends, sheaves over which said belt travels, and means for directly driving such sheaves, whereby driving tension is relieved from said belt.

EDWIN W. HAMMER.